United States Patent
Amagai

(10) Patent No.: US 10,468,647 B2
(45) Date of Patent: Nov. 5, 2019

(54) BATTERY PACK

(71) Applicant: Nissan Motor Co., Ltd., Yokohama-shi, Kanagawa (JP)

(72) Inventor: Ryuichi Amagai, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 121 days.

(21) Appl. No.: 15/030,923

(22) PCT Filed: Nov. 26, 2013

(86) PCT No.: PCT/JP2013/081789
§ 371 (c)(1),
(2) Date: Apr. 21, 2016

(87) PCT Pub. No.: WO2015/079496
PCT Pub. Date: Jun. 4, 2015

(65) Prior Publication Data
US 2016/0260947 A1    Sep. 8, 2016

(51) Int. Cl.
*H01M 2/12*    (2006.01)
*H01M 2/10*    (2006.01)
(Continued)

(52) U.S. Cl.
CPC ........... *H01M 2/12* (2013.01); *H01M 2/0202* (2013.01); *H01M 2/024* (2013.01);
(Continued)

(58) Field of Classification Search
CPC ...... H01M 2/12; H01M 2/1077; H01M 2/024; H01M 2/0202; H01M 2/1061;
(Continued)

(56) References Cited

U.S. PATENT DOCUMENTS

| | | | |
|---|---|---|---|
| 4,091,187 A | 5/1978 | Kaye | |
| 9,153,807 B2 | 10/2015 | Amagai et al. | |
| 2013/0288099 A1* | 10/2013 | Kim | H01M 2/1077 429/120 |

FOREIGN PATENT DOCUMENTS

| | | |
|---|---|---|
| CN | 101136457 A | 3/2008 |
| CN | 101897055 A | 11/2010 |

(Continued)

OTHER PUBLICATIONS

Supplementary European Search Report dated Nov. 3, 2016 (submitted by applicant Nov. 18, 2016).*

*Primary Examiner* — Milton I Cano
*Assistant Examiner* — Philip A. Stuckey
(74) *Attorney, Agent, or Firm* — Global IP Counselors, LLP

(57) ABSTRACT

A battery pack includes a first battery module and a second battery module arranged adjacent the first battery module so as to define an open space portion. Each of the first and second battery modules includes a case configured to house at least one single cell. Each case includes a wall portion including a vent through which an inside of the case is capable of communicating with an area outside the case, and a wall region without the vent. The vent disposed in the wall portion of the case of the first battery module opens toward the open space portion and toward the wall region of the case of the second battery module, when the first battery module is disposed adjacent to the second battery module.

17 Claims, 13 Drawing Sheets

(51) Int. Cl.
*H01M 2/02* (2006.01)
*H01M 10/0525* (2010.01)
*H01M 10/60* (2014.01)

(52) U.S. Cl.
CPC ....... *H01M 2/1061* (2013.01); *H01M 2/1077* (2013.01); *H01M 10/0525* (2013.01); *H01M 10/60* (2015.04); *H01M 2220/20* (2013.01); *H01M 2220/30* (2013.01)

(58) Field of Classification Search
CPC ......... H01M 2220/30; H01M 2220/20; H01M 10/60; H01M 10/0525
See application file for complete search history.

(56) References Cited

FOREIGN PATENT DOCUMENTS

| | | |
|---|---|---|
| JP | 50-92420 A | 7/1975 |
| JP | 5-121056 A | 5/1993 |
| JP | 2001-60466 A | 3/2001 |
| JP | 2003-59471 A | 2/2003 |
| JP | 2006-156090 A | 6/2006 |
| JP | 2008-59941 A | 3/2008 |
| JP | 2008-282681 A | 11/2008 |
| JP | 2009-37785 A | 2/2009 |
| JP | 2009-123371 A | 6/2009 |
| JP | 2010-27501 A | 2/2010 |
| JP | 2011-204577 A | 10/2011 |
| JP | 2012-164545 A | 8/2012 |
| JP | 2014-139867 A | 7/2014 |
| WO | 2009/074421 A1 | 6/2009 |
| WO | 2010/131780 A1 | 11/2010 |
| WO | 2012/153633 A1 | 11/2012 |

* cited by examiner

BATTERY PACK

CROSS-REFERENCE TO RELATED APPLICATIONS

This application is a U.S. National Stage Application of International Application No. PCT/JP2013/081789, filed Nov. 26, 2013, the contents of which is hereby incorporation herein by reference.

BACKGROUND

Field of Invention

The present invention relates to a battery pack.

Background Information

In recent years, in the fields of automobile industry, advanced electronic industry, and the like, the demand for secondary batteries such as automobile batteries and batteries for electronic devices is increasing. In these secondary batteries, an exterior member made of a flexibly deformable laminate sheet seals a single cell which is a battery element. Additionally, a cell unit comprising a stacked body in which multiple single cells are stacked is surrounded by an upper and lower case, to configure a battery module (for example, refer to Japanese Laid Open Patent Application No. 2008-282681). A vent portion having a vertically symmetrical shape and size for venting the high-temperature gas, which is generated at the time of use, is disposed on the lower case of the battery module disclosed in Japanese Laid Open Patent Application No. 2008-282681.

SUMMARY

When multiple battery modules disclosed in Japanese Laid Open Patent Application No. 2008-282681 are arranged side-by-side, the vent portions of the batteries adjacent to each other face each other. Consequently, the high-temperature gas that is generated within the case of one battery module, accompanying the use of a secondary battery, flows into the case of another battery module, via the vent portion of one battery module, and the vent portion of another battery module adjacent to said battery module. Therefore, due to the high-temperature gas generated within the case of one battery module, there is the risk of deterioration in the cell unit of another battery module adjacent thereto.

The present invention has been made to solve the above problem, and an object thereof is to provide a battery pack that can reduce deterioration, due to the high-temperature gas generated within the case of one battery module, in the cell unit of another battery module adjacent thereto.

A battery pack of the present invention which achieves the object above is a battery pack in which multiple battery modules, each having a case containing at least one single cell, are arranged via an open space portion, a wall part of each case has a vent, through which the inside and the outside of the case communicate with each other, and a wall region where the vent is not provided, and a vent of a case of one battery module is open toward the space portion, and, open toward a wall region of a case of another battery module, which is adjacent to the battery module.

With a battery module configured in the manner described above, the vent disposed on the case of one battery module faces a wall region disposed on the case of another battery module, which is adjacent to the battery module. Accordingly, the vent disposed on one battery module and the vent disposed on another battery module do not face each other. Therefore, among the high-temperature gas that is generated within the case of one battery module, the amount of high-temperature gas that enters the case of another battery module can be reduced. Therefore, a battery pack that is capable of reducing deterioration of a cell unit of another adjacent battery module due to a high-temperature gas generated within the case of one battery module can be provided.

BRIEF DESCRIPTION OF THE DRAWINGS

Referring now to the attached drawings which form a part of this original disclosure.

DETAILED DESCRIPTION OF THE EMBODIMENTS

First Embodiment

An embodiment of the present invention will be explained below, with reference to the appended drawings. In the explanations of the drawings, the same elements are given the same reference identifiers, and overlapping explanations are omitted. Dimensional ratios of the drawings are exaggerated for convenience of explanation and may be different from the actual ratio.

Figure 1:
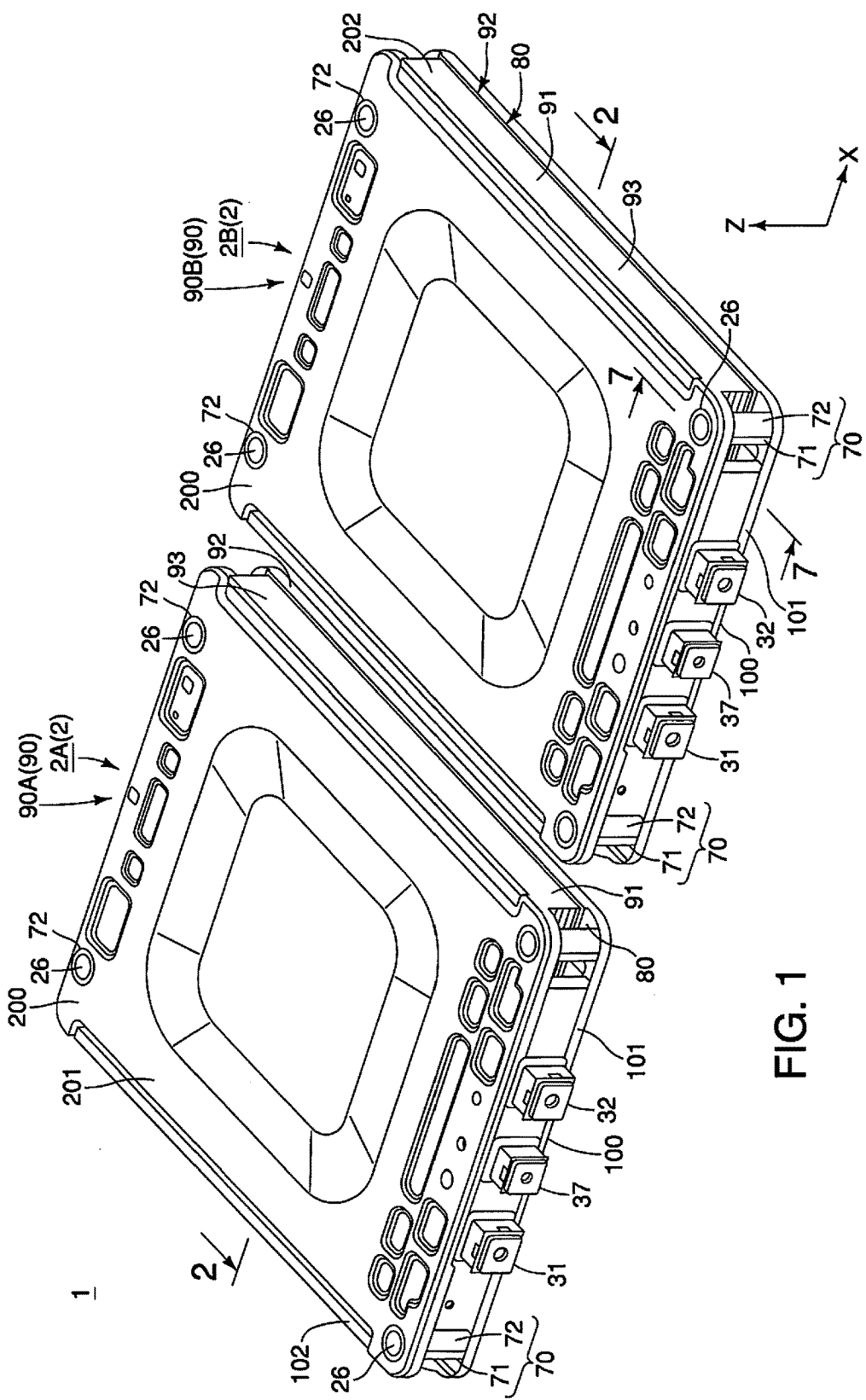
FIG. 1 is a perspective view showing a battery pack according to a first embodiment of the present invention.
Figure 2:
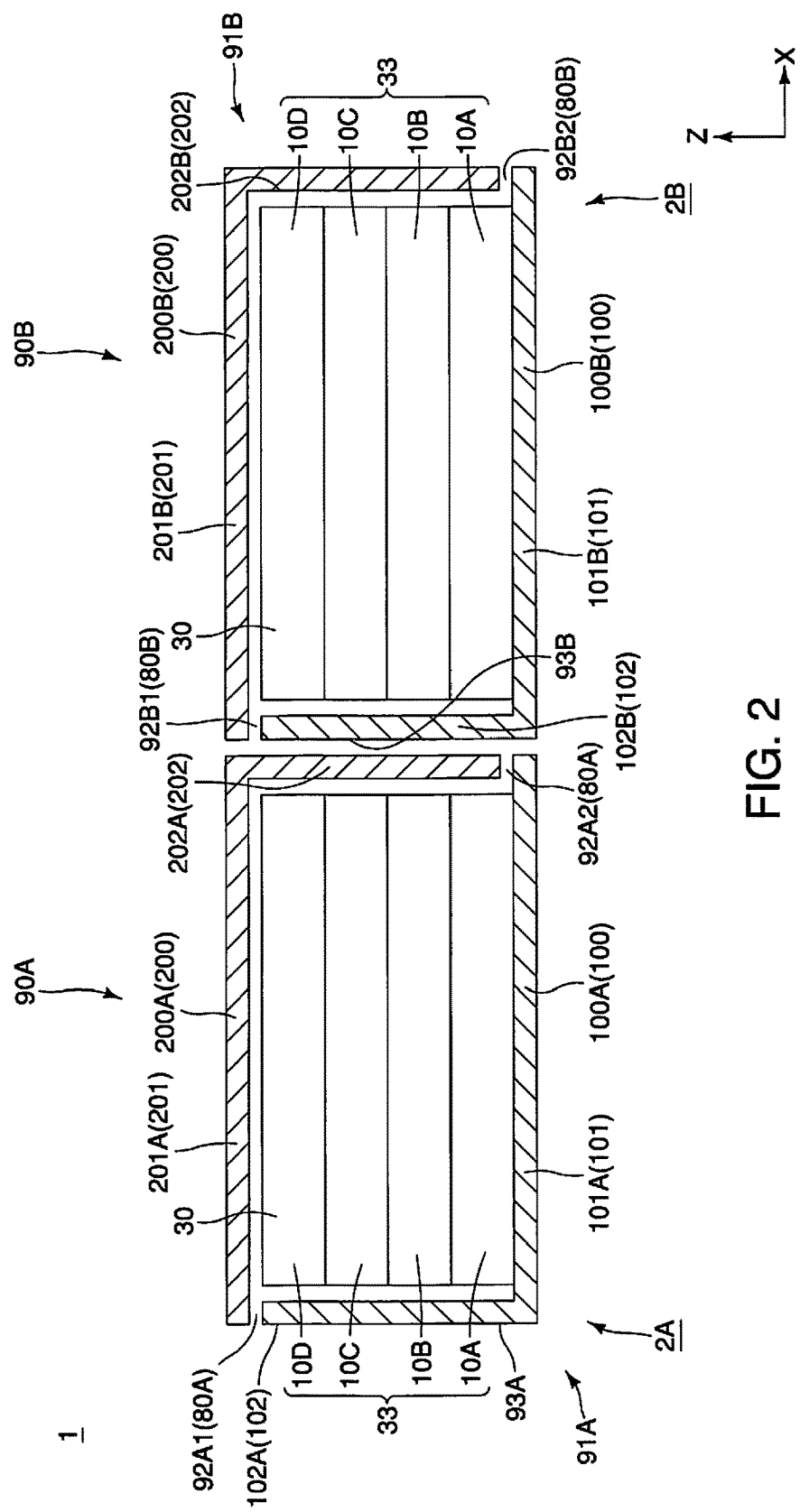
FIG. 2 is a schematic sectional view taken along line 2-2 in FIG. 1.
Figure 3:
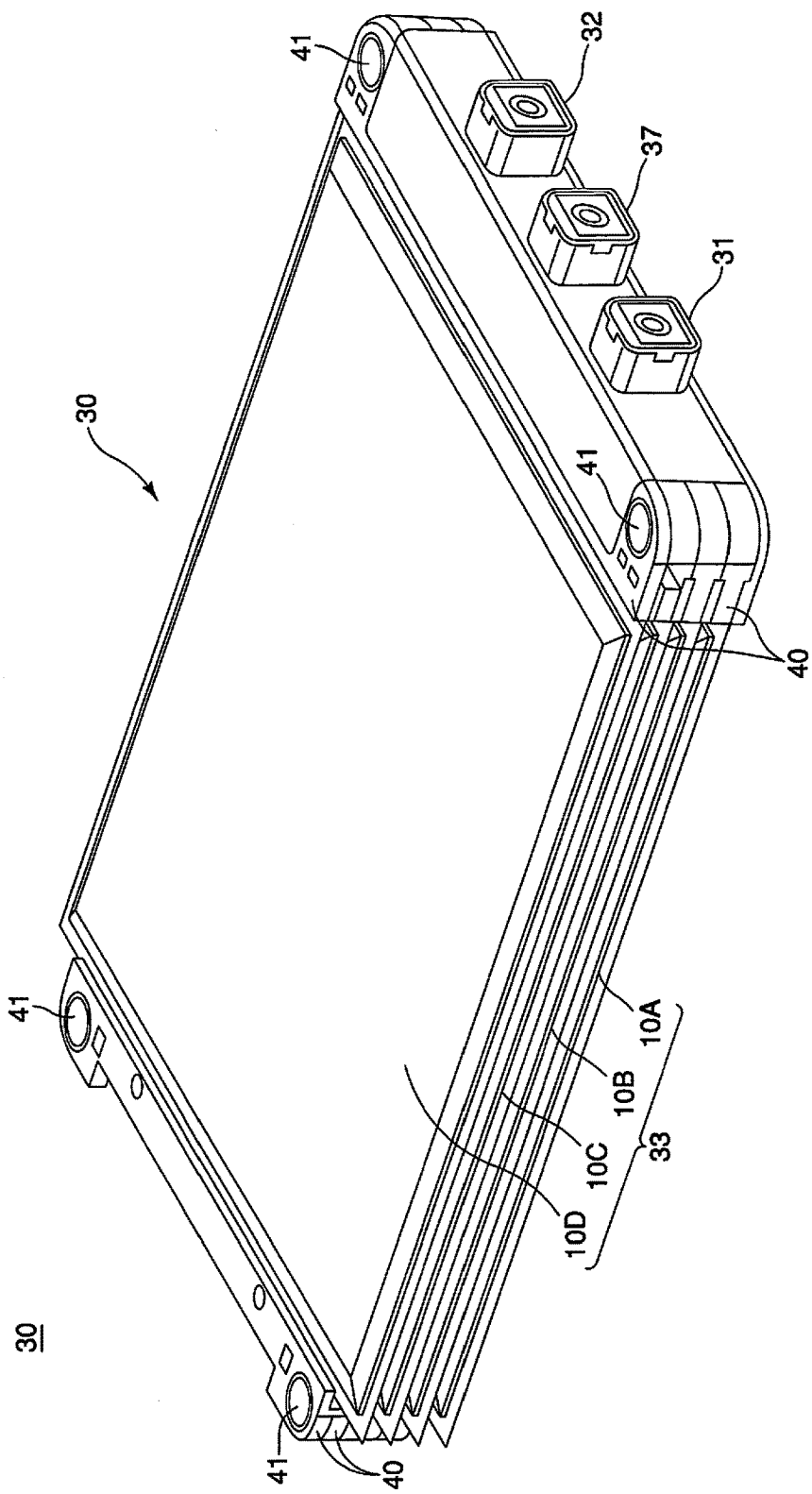
FIG. 3 is a perspective view of a cell unit of the battery module.
Figure 4:
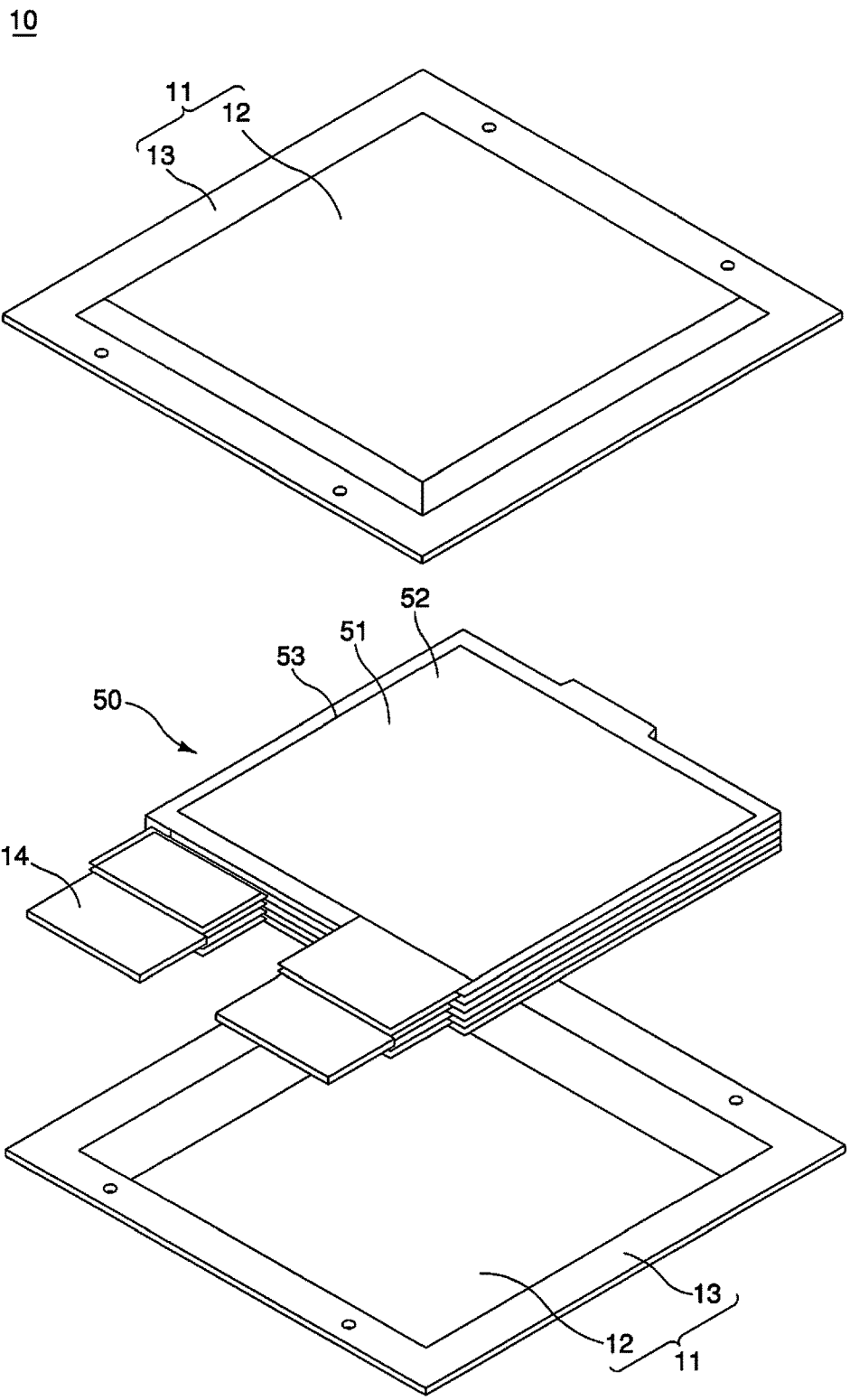
FIG. 4 is an exploded perspective view showing the internal structure of the single cell of the battery module.
Figure 5:
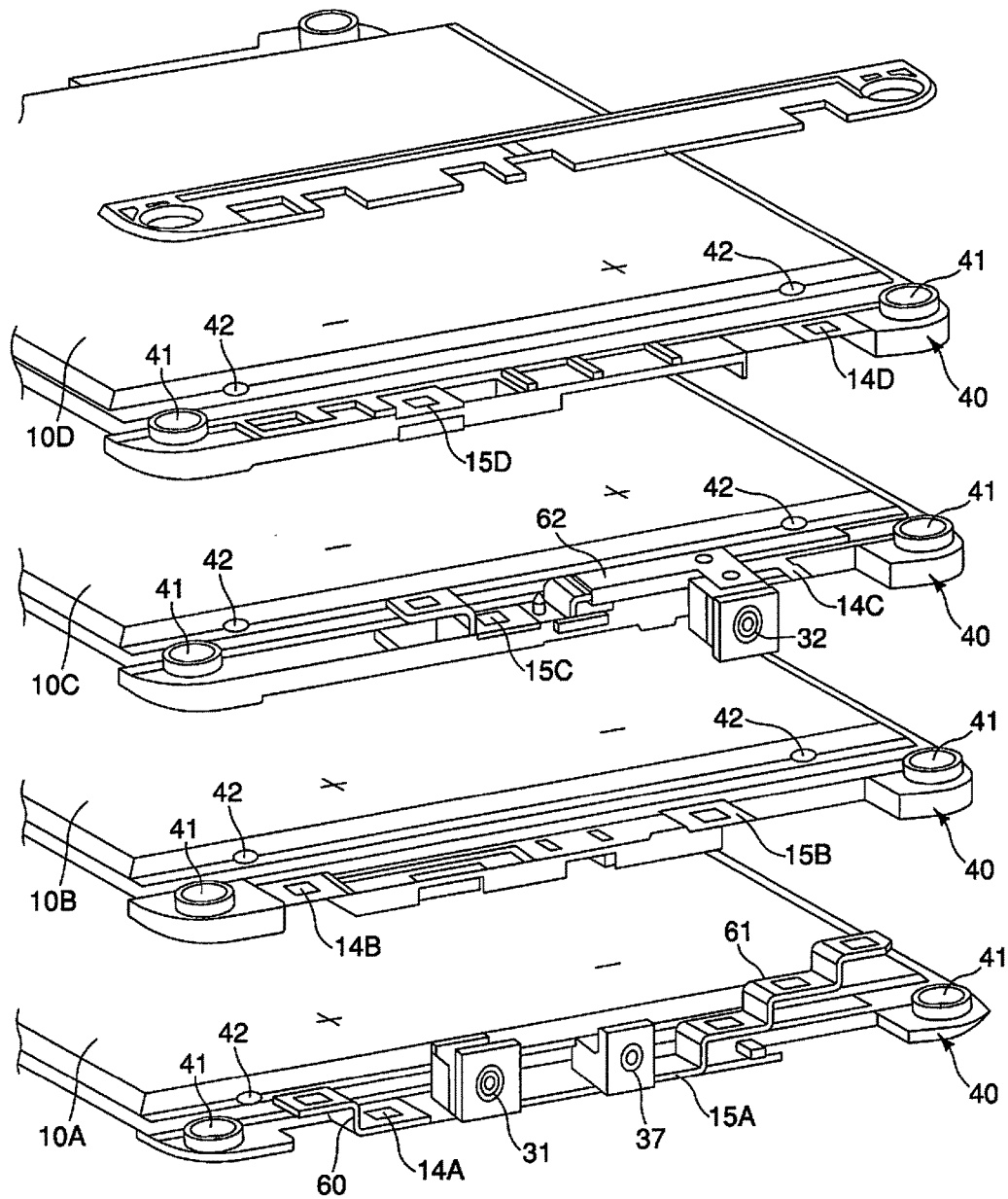
FIG. 5 is an exploded perspective view showing the internal structure of the cell unit of the battery module.
Figure 6:
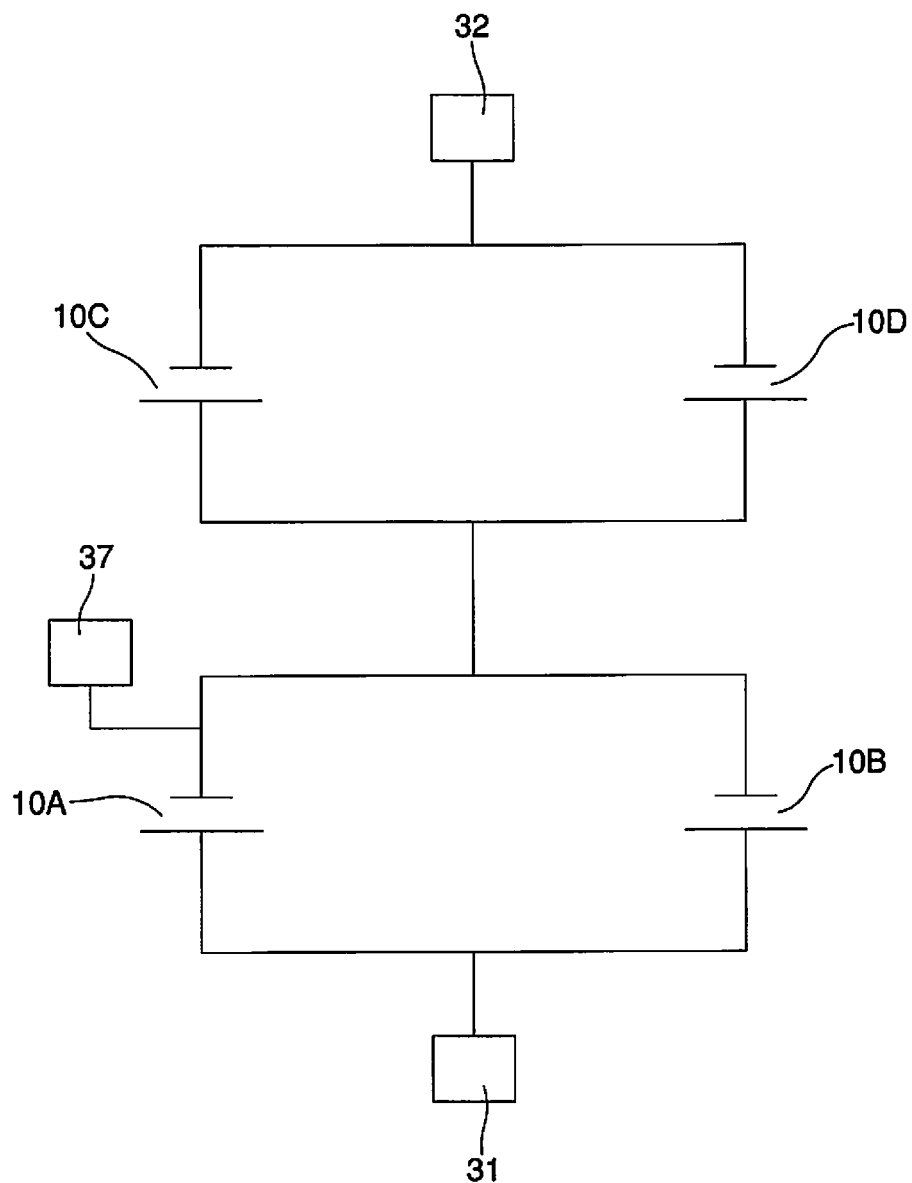
FIG. 6 is a diagram showing an electrical connection of multiple single cells configuring the battery module.
Figure 7:
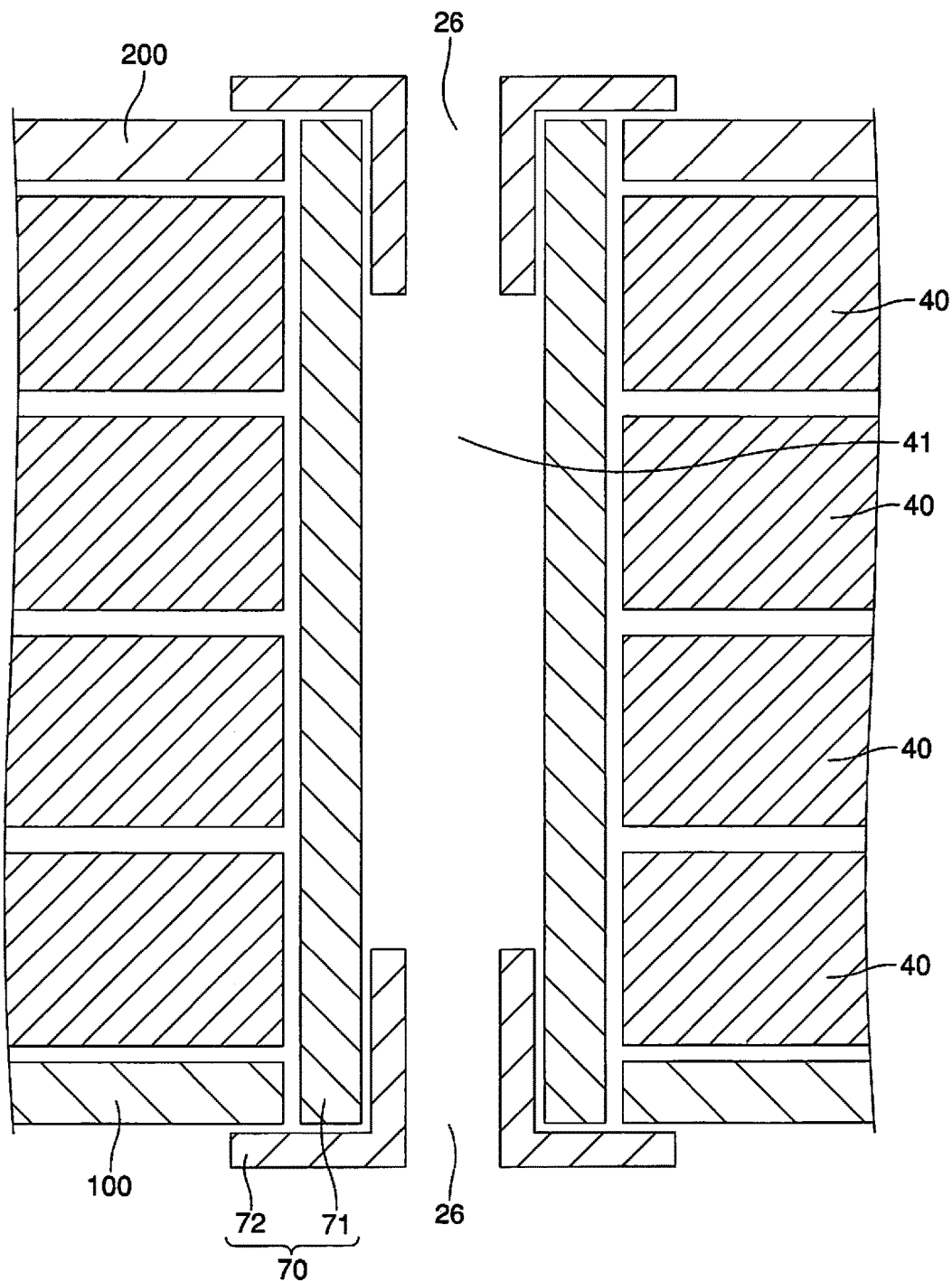
FIG. 7 is a sectional view taken along line 7-7 of FIG. 1.

FIG. 1 is a perspective view of a battery pack 1 pertaining to a first embodiment of the present invention. FIG. 2 is a schematic sectional view taken along line 2-2 in FIG. 1. In FIG. 2, for simplicity of description, a cell unit 30 is described by a block body. FIG. 3 is a perspective view of a cell unit 30 of the battery module 2. FIG. 4 is an exploded perspective view showing the internal structure of the single cell 10 of the battery module 2. FIG. 5 is an exploded perspective view showing the internal structure of the cell unit 30 of the battery module 2. FIG. 6 is a diagram showing an electrical connection of multiple single cells 10 configuring the battery module 2. FIG. 7 is a sectional view taken along line 7-7 of FIG. 1.

To outline a battery pack 1 according to the first embodiment of the present invention, as illustrated in FIG. 1 and FIG. 2, a battery pack 1 is configured from two arranged battery modules 2 (2A and 2B) comprising two cases 90 (90A and 90B) for housing four single cells 10 (10A-10D). Wall portions 91 (91A and 91B) of the cases 90 comprise vents 92 (92A and 92B) through which the inside and the outside of the case 90 communicate with each other, and wall regions 93 (93A and 93B) where the vents 92 are not provided. The vent 92A disposed on the case 90A of one battery module 2A faces a wall region 93B disposed on the case 90B of another battery module 2B, which is adjacent to the battery module 2A. The details are described below.

In the battery pack 1 according to the present embodiment, two battery modules 2A and 2B are arranged in an X direction.

The battery module 2 comprises a cell unit 30 comprising four single cells 10 (10A-10D), a case 90 which houses, so as to surround, the cell unit 30, and a fastening device 70 for fastening the cell unit 30 and the case 90.

As illustrated in FIG. 3, the cell unit 30 comprises a stacked body 33 with four single cells 10 (10A-10D) stacked on one another and electrically connected to each other, a spacer 40 for fixing the four single cells 10 (10A-10D), external output terminals 31 and 32, and a voltage detection terminal 37. Note that the stacked body 33 is formed from four single cells 10 (10A-10D) in the present embodiment, but being formed from at least one is sufficient. The external output terminals 31 and 32 are formed from an external output positive electrode terminal 31 and an external output negative electrode terminal 32.

As illustrated in FIG. 4, the single cell 10 is, for example, a lithium ion secondary battery in which a stacked electrode body 50 is housed together with an electrolyte in an exterior member 11 arranged on both sides of the stacked electrode body 50. The single cell 10 comprises a positive electrode tab 14 and a negative electrode tab 15 derived from the outer member 11 to the outside.

The stacked electrode body 50 is an electrode group formed by alternately stacking a positive electrode 51, a separator 53, and a negative electrode 52. The positive electrode 51 comprises a positive electrode active material layer composed of a transition metal complex oxide, for example, $LiMn_2O_4$. The negative electrode 52 comprises a negative electrode active material layer composed of a carbon and lithium-transition metal complex oxide. The separator 53 is formed, for example, from porous PE (polyethylene) comprising air permeability that can penetrate the electrolyte.

The outer or package member 11 is formed, from the viewpoint of weight reduction and thermal conductivity, of a sheet member such as a polymer-metal composite laminate film in which a metal such as aluminum, stainless steel, nickel, copper, etc. (including alloys) is coated with an insulator such as a polypropylene film. The exterior member 11 has a main portion 12 covering the stacked electrode body 50 and a periphery portion 13 extending to the periphery of the body portion 12 with a part or the entire periphery portion 13 joined by heat fusion.

The positive electrode tab 14 and the negative electrode tab 15 are members for drawing current from the stacked electrode body 50 and are extended to one side of the single cell 10.

As illustrated in FIG. 5, the spacer 40, comprises a second through hole 41 at both ends in the X direction. The second through hole 41 is aligned with the first through hole 26 of the case 90, as described below, and can have a sleeve 71 inserted therein. An electrically insulating resin material can be used as the spacer 40.

In addition, the positive electrode tab 14A of the first single cell 10A and the positive electrode tab 14B of the second single cell 10B are joined by ultrasonic welding or the like to a bus bar 60 which is connected to the external output positive terminal 31. On the other hand, the negative electrode tab 15A of the first single cell 10A and the negative electrode tab 15B of the second single cell 10B are connected, jointly with the positive electrode tabs 14C and 14D of the third and fourth single cells 10C and 10D, to a bus bar 61 by ultrasonic welding or the like, which is electrically connected to the voltage detection terminal 37. Additionally, the negative electrode tab 15C of the third singe cell 10C and the negative electrode tab 15D of the fourth single cell 10D are connected to a bus bar 62 by ultrasonic welding or the like, which is electrically connected to the external output negative terminal 32.

As described above, each of the electrode tabs 14A-14D and 15A-15D of the single cells 10A-10D are connected via the bus bar 60, 61 and 62 to the external output positive electrode terminal 31, the external output negative electrode terminal 32, and the voltage detection terminal 37, respectively; thus, as illustrated in FIG. 6, the single cells 10A-10D are configured to form a two parallel two series connection.

The voltage detection terminal 37 can detect the voltage of the single cells 10A-10D forming the battery module 2. Specifically, by using the external output positive terminal 31 and the voltage detection terminal 37 and measuring the voltage between the terminals, the voltage of the first single cell 10A and that of the second single cell 10B can be detected. Additionally, the voltage of the third single cell 10C and that of the fourth single cell 10D can be detected by using the external output negative terminal 32 and the voltage detection terminal 37 and measuring the voltage between the terminals.

The case 90 houses, so as to surround, the cell unit 30. The case 90 comprises a first case (case portion) 100 and a second case (case portion) 200. In addition, a wall portion 91 of the case 90, as described above, comprises a vent 92 through which the inside and the outside of the case 90 communicate with each other, and a wall region 93 where a vent 92 is not provided.

The case 90A of one battery module 2A and the case 90B of another battery module 2B are of the same shape.

The first case 100 (100A and 100B) and the second case 200 (200A and 200B), respectively comprise main surfaces 101 (101A and 101B) and 201 (201A and 201B) disposed along a surface direction of the single cells 10, and side surfaces 102 (102A and 102B) and 202 (202A and 202B) bent at one end of the main surfaces 101 and 201, and extending in a Z direction, as illustrated in FIG. 2. The first case 100 and the second case 200 are of the same shape, but no limitation is imposed thereby, and the cases may be of different shapes. The first case 100 and the second case 200 are arranged in a staggered manner.

The first case 100 and the second case 200 comprise mating portions 80 (80A and 80B) that are opposed to each other via a gap. The vent 92 through which the inside and the outside of the case 90 communicate is formed from the mating portion 80. Additionally, among the wall portions 91 of the case 90, the wall region 93 where the vent 92 is not provided is formed from side surfaces 102 and 202.

As described above, the battery pack 1 is formed from two battery modules 2A and 2B arranged in an X direction. Here, a side surface 202A of the second case 200A of one battery module 2A and a side surface 102B of the first case 100B of another battery module 2B face each other. In addition, the mating portions 80A and 80B of the side surfaces 202A and 102B which face each other differ in the height from the main surface 101A of the first case 100A.

In other words, a vent 92A2 disposed on a right side in an X direction among the vents 92A disposed on the case 90A of one battery module 2A faces a wall region 93B disposed on the case 90B of another battery module 2B. Therefore, the vent 92A2 disposed on a right side in an X direction among the vents 92A disposed on the case 90A of one battery module 2A does not face a vent 92B1 disposed on a left side in the X direction among the vents 92B disposed on the case 90B of another battery module 2B. In addition, as illustrated in FIG. 2, the vent 92B1 is disposed at a high position in the Z direction (a direction that intersects with the surface direction of the single cell 10).

The main surface 101 and 201 each has four first through-holes 26 penetrating in the Z direction, as illustrated in FIGS. 1 and 7. The material of the case 90 is preferably a material having a higher melting point than the heat flow temperature (700 to 1000° C. or above) ejected when the battery module 2 is damaged, such as steel and the like.

The fastening device 70 fastens the first case 100, the cell unit 30, and the second case 200 together, as illustrated in FIG. 7. The fastening device 70 comprises a sleeve 71 which is inserted into the first through hole 26 and the second through hole 41, and a press-fit collar 72 for fastening the first case 100, the cell unit 30, and the second case 200 by being pressed from above and below the sleeve 71. In the present embodiment, the fastening device 70 comprises the sleeve 71 and the press-fit collar 72, but the structure is not limited thereto as long as the first case 100, the cell unit 30, and the second case 200 can be fastened.

Next, a method for assembling the battery pack 1 according to the first embodiment of the present invention will be described with reference to FIGS. 8A-8E. FIGS. 8A-8E area schematic cross-sectional views illustrating a method for assembling a battery module 2 according to the present embodiment.

Figure 8A:
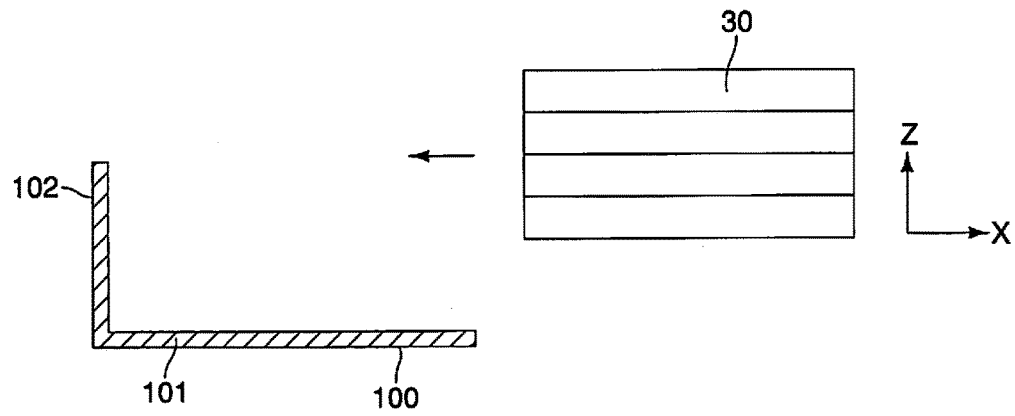
FIGS. 8A-8E are schematic cross-sectional views illustrating a method of assembling a battery module in the first embodiment.
Figure 8B:
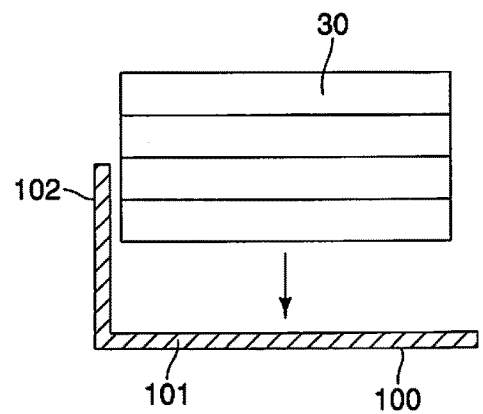
Figure 8E:
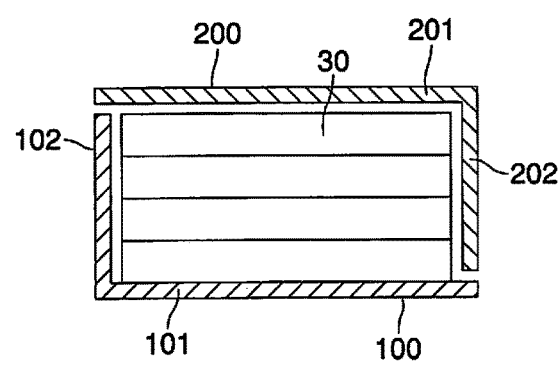
Figure 8C:
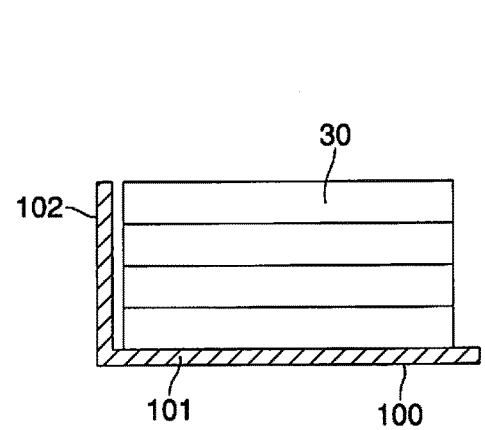
Figure 8D:
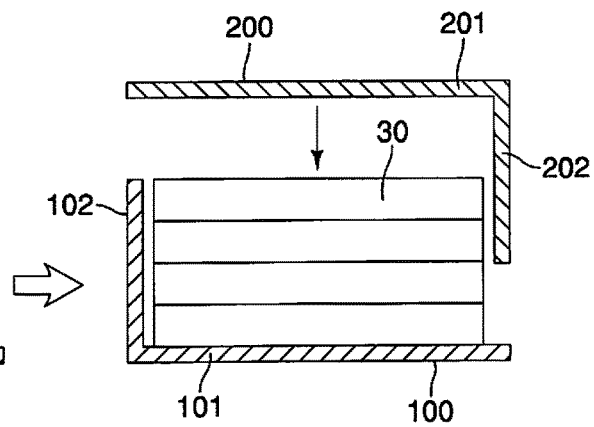

First, the cell unit 30 is placed on the upper right of the first case 100 in the XZ plane (refer to FIG. 8A). Then, the cell unit 30 is moved leftward in the X direction until the cell unit 30 contacts the side surface 102 of the first case 100 (refer to FIG. 8B). Then, by using the side surface 102 as a guide, the cell unit 30 is moved downward in the Z direction until the cell unit 30 contacts the main surface 101 of the first case 100 (refer to FIG. 8C). Then, the second case 200 is placed on the upper right of the cell unit 30 in the XZ plane, and the second case 200 is moved leftward in the X direction until the side surface 202 of the second case 200 contacts the cell unit 30 (refer to FIG. 8D). Finally, by using the side surface 202 as a guide, the second case 200 is moved downward in the Z direction until the main surface 201 of the second case 200 contacts the cell unit 30 (refer to FIG. 8E).

A battery pack 1 is formed by arranging the battery modules 2 assembled by the above steps, in the X direction.

In the present embodiment, the cell unit 30 is moved with respect to the first case 100, and the second case 200 is moved with respect to the cell unit 30 to assemble the battery module 2. However, the battery module 2 may be assembled by moving the first case 100 with respect to the cell unit 30, and by moving the cell unit 30 and the first case 100 with respect to the second case 200, as well.

In the present embodiment, the battery pack 1 is configured from two battery modules 2 stacked in the X direction, but no limitation is imposed thereby, and three or more battery modules 2 may be suitably stacked in accordance with the desired electric current, voltage, and capacitance, as well.

As described above, a battery pack 1 according to the first embodiment of the present invention is a battery pack 1 in which two battery modules 2 (2A and 2B) comprising two cases 90 (90A and 90B) for housing four single cells 10 (10A-10D) are arranged. A wall portion 91 of the case 90 comprises a vent 92 through which the inside and the outside of the case 90 communicate with each other, and a wall region 93 where a vent 92 is not provided. The vent 92A disposed on the case 90A of one battery module 2A faces a wall region 93B disposed on the case 90B of another battery module 2B, which is adjacent to the battery module 2A. Accordingly, the vent 92A disposed on one battery module 2A and the vent 92B disposed on another battery module 2B do not face each other. Therefore, among the high-temperature gas that is generated within the case 90A of one battery module 2A, the amount of high-temperature gas that enters the case 90B of another battery module 2B can be reduced. Therefore, deterioration in the cell unit 30 of another adjacent battery module 2B due to the high-temperature gas generated within the case 90A of one battery module 2A can be reduced.

In addition, the vents 92A1 and 92B1 are disposed at a high position in the direction that intersects with the surface direction of the single cell 10. According to this configuration, since the high-temperature gas generated in the case 90 stays in the upper side, by providing the vents 92A1 and 92B1 at a high position, the ventilation efficiency of the high-temperature gas is improved.

In addition, the case 90 comprises a first case 100 and a second case 200, the first case 100 and the second case 200 comprise mating portions 80 that are opposed to each other via a gap, and the vent 92 is configured from the mating portion 80. Accordingly, the vents 92 can be easily formed, and the manufacturing of the battery pack 1 is easy.

In addition, the cases 90A and 90B of the battery modules 2A and 2B, respectively, are of the same shape. Therefore, it is possible to reduce the number of components while reducing the cost.

Second Embodiment

Next, a second embodiment of the present invention will be described. Parts common to the first embodiment will be omitted, and a description is given only of portions characteristic to the second embodiment. A battery pack 3 according to the second embodiment differs from the battery pack 1 according to the first embodiment in the shape of a case 190.

Figure 9:
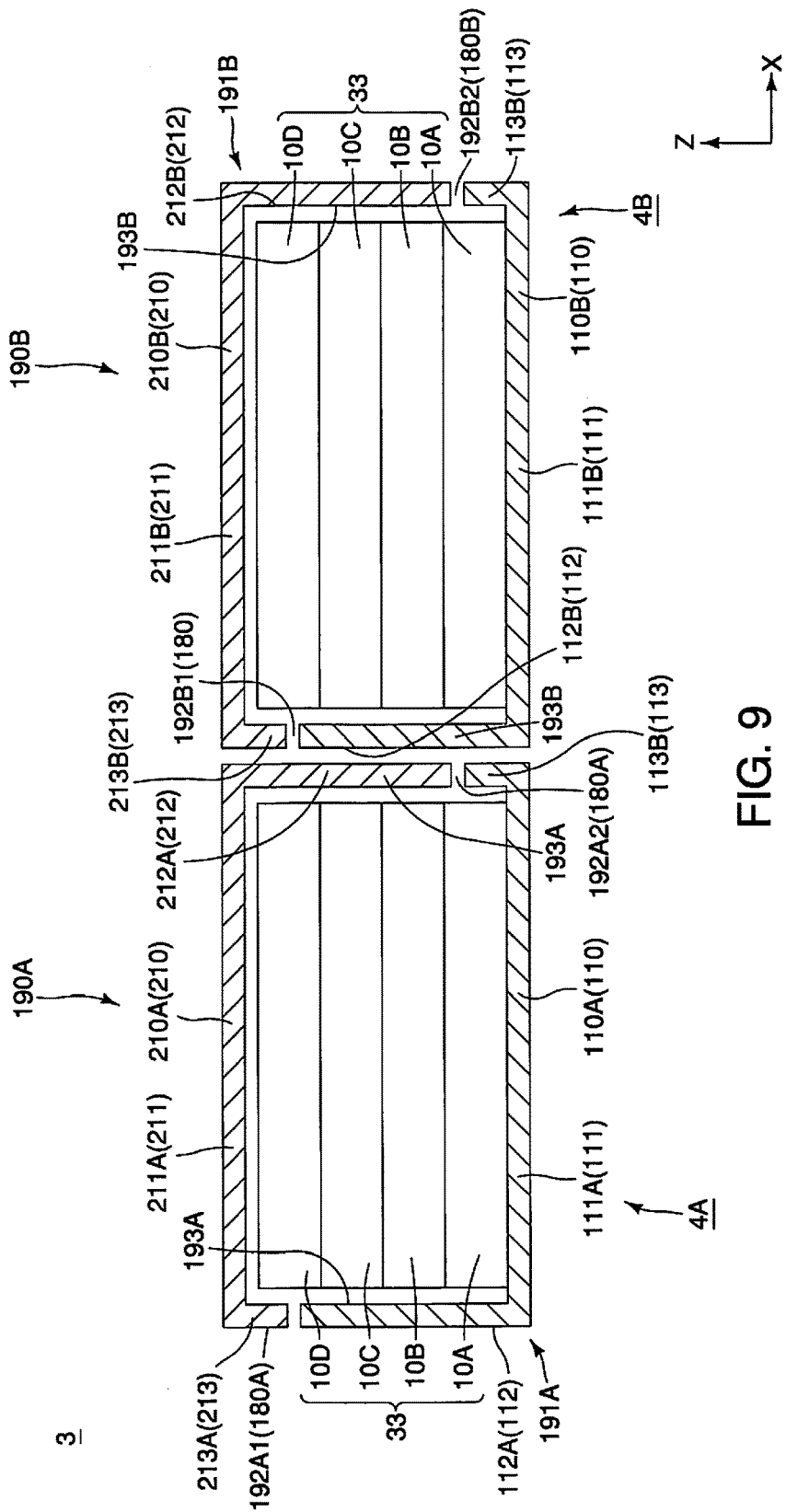
FIG. 9 is a schematic sectional view showing a battery pack according to a second embodiment of the present invention.

FIG. 9 is a schematic cross-sectional view showing a battery pack 3 according to the second embodiment of the present invention. The cross-sectional diagram illustrated in FIG. 9 corresponds to the cross-sectional diagram illustrated in FIG. 2 according to the first embodiment.

A battery pack 3 according to the second embodiment of the present invention is a battery pack 3 in which two battery modules 4 comprising cases 190 for housing four single cells 10 (10A-10D) are arranged, as illustrated in FIG. 9.

The case 190 comprises a first case 110 (110A, 110B) and a second case 210 (210A, 210B). Wall portions 191 (191A and 191B) of the cases 190 comprise vents 192 (912A and 192B) through which the inside and the outside of the case communicate with each other, and wall regions 193 (193A and 193B) where the vents 192 are not provided.

The case 190A of one battery module 4A and the case 190B of another battery module 4B are of the same shape. The case 190A and the case 190B may be of different shapes, and one may be the same shape as the case 90 according to the first embodiment, as well.

The first case 110 and the second case 210, as illustrated in FIG. 9, each include a main surface 111 (111A, 111B) and 211 (211A, 211B), and a pair of side surfaces 112 (112A, 112B), 113 (113A, 113B), and 212 (212A, 212B), 213 (213A, 213B), bent at both ends of the main surfaces 111 and 211, and extending with different lengths in a direction away from the main surfaces 111 and 211. The first case 110 and the second case 210 are of the same shape, but no limitation is imposed thereby, and the cases may be of different shapes. The first case 110 and the second case 210 are arranged in a staggered manner.

The first case 110 and the second case 210 comprise two mating portions 180 (180A and 180B) that are opposed to each other via a gap. The vent 192 through which the inside and the outside of the case 190 communicate is formed from the mating portion 180. Additionally, among the wall portions 191 of the case 190, the wall region 193 where the vent 192 is not provided is configured from side surfaces 112, 113, 212, and 213.

As described above, the battery pack 3 is configured from two battery modules 4A and 4B arranged in an X direction. Here, a side surface 212A of the second case 210A of one battery module 4A and a side surface 112B of the first case 110B of another battery module 4B face each other. In addition, the mating portions 180A and 180B of the side surfaces 212A and 112B which face each other differ in the height from the main surface 111A of the first case 110A.

In other words, a vent 192A2 disposed on a right side in an X direction among the vents 192A disposed on the case 190A of one battery module 4A faces a wall region 193B disposed on the case 190B of another battery module 4B. Therefore, the vent 192A2 disposed on a right side in an X direction among the vents 192A disposed on the case 190A of one battery module 4A does not face a vent 192B1 disposed on a left side in the X direction among the vents 192B disposed on the case 190B of another battery module 4B.

Since the assembly method of the battery module 4 on the battery pack 3 according to the second embodiment and the assembly method of the battery module 2 of the battery pack 1 according to the first embodiment are the same, the description thereof is omitted.

According to the battery pack 3 formed in the above manner, the vent 192A disposed on one battery module 4A and the vent 192B disposed on another battery module 4B do not face each other. Therefore, among the high-temperature gas that is generated within the case 190A of one battery module 4A, the amount of high-temperature gas that enters the case 190B of another battery module 4B can be reduced. Therefore, deterioration in the cell unit 30 of another adjacent battery module 4B due to the high-temperature gas generated within the case 190A of one battery module 4A can be reduced.

Third Embodiment

Next, a third embodiment of the present invention will be explained. Parts common to the first embodiment and the second embodiment will be omitted, and a description is given only of portions characteristic to the third embodiment. A battery pack 5 according to the third embodiment differs from the first embodiment and the second embodiment in the shape of a case 290.

Figure 10:
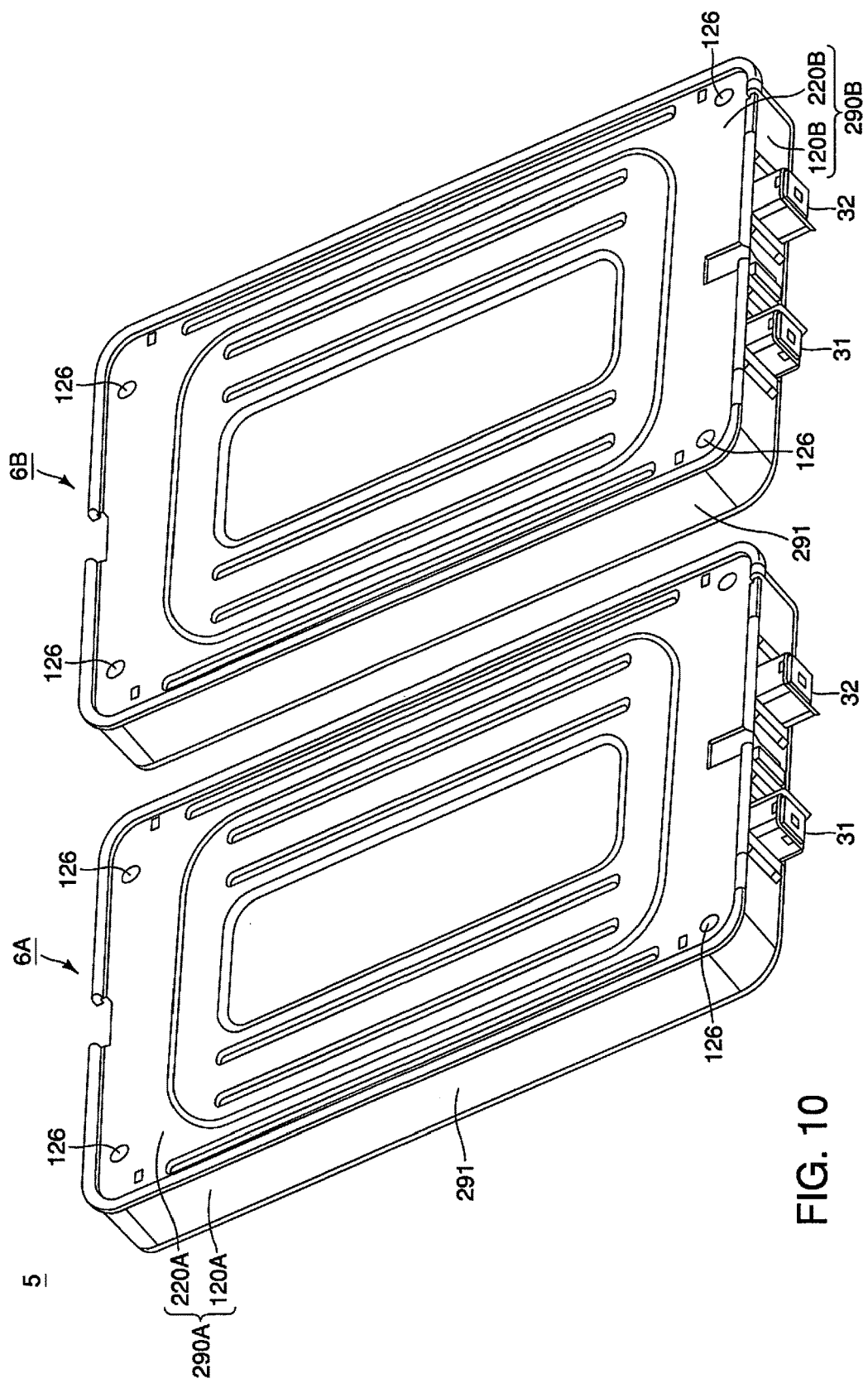
FIG. 10 is a schematic perspective view showing a battery pack according to a third embodiment of the present invention.
Figure 11:
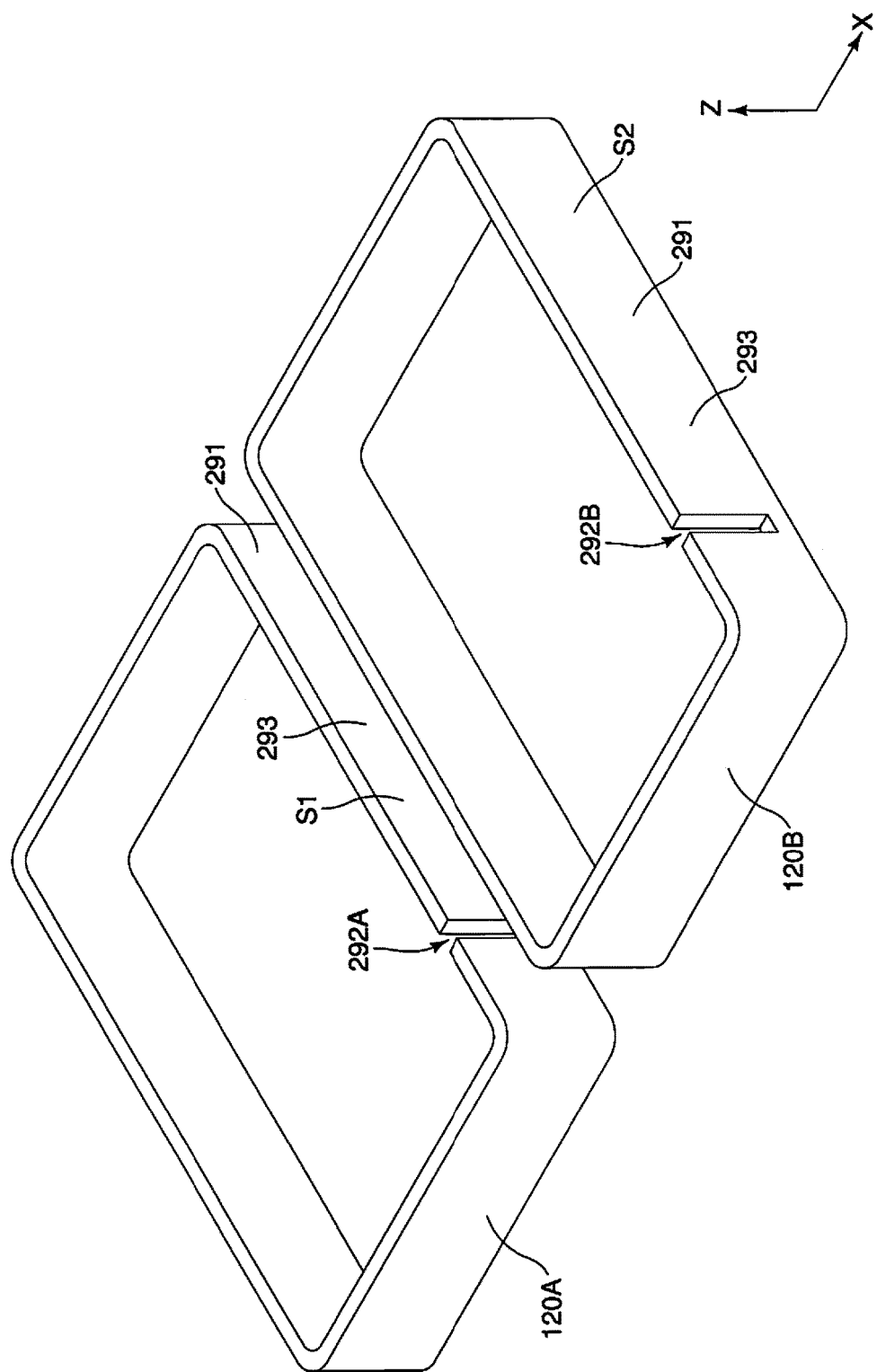
FIG. 11 is a schematic perspective view showing a lower case of the battery pack according to the third embodiment of the present invention.

FIG. 10 is a schematic perspective view showing a battery pack 5 according to the third embodiment of the present invention. In FIG. 10, the vent 292 and the voltage detection terminal 37 are omitted. FIG. 11 is a schematic perspective view showing a lower case 120 of the battery pack 5 according to the third embodiment of the present invention, for explaining the placement position of the vent 292.

A battery pack 5 according to the third embodiment of the present invention is a battery pack 5 in which two battery modules 6 (6A and 6B) comprising cases 290 (290A and 290B) for housing four single cells 10 (10A-10D) are arranged.

The case 290 comprises a substantially rectangular shaped lower case 120 (120A, 120B) which forms a box shape and an upper case 220 (220A, 220B) which forms a lid. The edge portion of the upper case 220 is tightly wound to the edge portion of the peripheral wall of the lower case 120, by caulking. The lower case 120 and the upper case 220 are formed from a relatively thin-walled steel plate or aluminum plate. The lower case 120 and the upper case 220 comprise a first through-hole 126. The through-hole 126 has the same effect as the first through-hole 26 according to the first embodiment. In addition, a wall portion 291 of the case 290 comprises a vent 292 through which the inside and the outside of the case 290 communicate with each other, and a wall region 293 where a vent 292 (292A, 292B) is not provided.

The case 290A of one battery module 6A and the case 290B of another battery module 6B are of the same shape. In addition, the lower case 120A of one battery module 6A and the lower case 120B of another battery module 6B are of the same shape. The lower case 120A of one battery module 6A and the lower case 120B of another battery module 6B may be of different shapes, as well.

As illustrated in FIG. 11, the vent 292 according to the third embodiment is disposed only on one surface of the lower case 120. A surface S1 comprising the vent 292A disposed on one lower case 120A and a surface S2 comprising the vent 292B disposed on another adjacent lower case 120B are each formed on the lower right side in the X direction in FIG. 11. That is, the surface S1 comprising the vent 292A faces a surface different from the surface S2 comprising the vent 292B. As long as the surface S1 including the vent 292A and the surface S2 including the vent 292B do not face each other, the vents 292A and 292B can be disposed on any of the surfaces.

The vent 292 is formed by press working or laser processing, for example. Note that, as in the first embodiment and the second embodiment, the vent may be formed from the mating portions of the two cases.

As described above, in the battery pack 5 according to the third embodiment of the present invention, the vent 292 is disposed only on one surface of the lower case 120, and the surface S1 comprising the vent 292A disposed on one battery module 6A faces a surface different from the surface S2 comprising the vent 292B disposed on another battery module 6B. Accordingly, the battery modules 6 can be arranged using the vent 292 as a mark, and workability improves.

Below, a modification of the above embodiment is described.

First Modification

Figure 12:
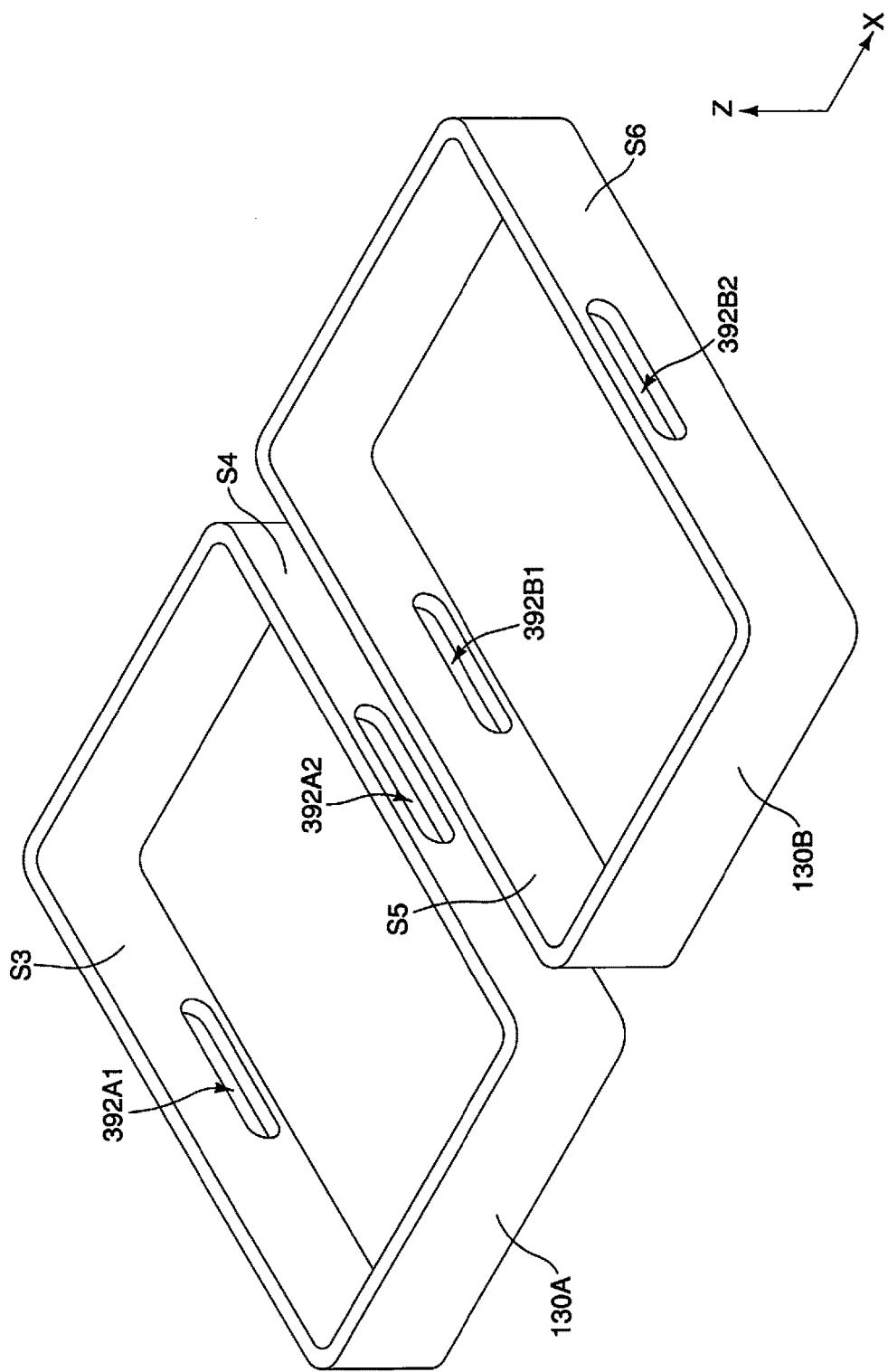
FIG. 12 is a schematic perspective view showing a lower case according to a first modification.

FIG. 12 is a schematic perspective view showing a lower case 130 according to a first modification. In the third embodiment described above, the vent 292 is disposed only on one surface of the lower case 120, and the surface S1 comprising the vent 292A disposed on one battery module 6A faces a surface different from the surface S2 comprising the vent 292B disposed on another battery module 6B. However, as illustrated in FIG. 12, vents 392 (392A1, 392A2, 392B1, and 392B2) may be formed, as well. The forming position of the vent 392 according to the first modification will be described below.

The vent 392 is disposed on two surfaces of one lower case 130 (130A, 130B). Namely, a vent 392A is disposed on two surfaces S3 and S4 of a lower case 130A. Additionally, a vent 392B is disposed on two surfaces S5 and S6 of a lower case 130B.

Surface S3 and surface S4 are disposed on opposing surfaces among the side surfaces of the lower case 130A. In addition, surface S5 and surface S6 are disposed on opposing surfaces among the side surfaces of the lower case 130B. Meanwhile, the surfaces S3 and S4, as well as the surfaces S5 and S6, may be disposed on adjacent surfaces.

In addition, in the lower case 130, the first vents 392A2 and 392B2 disposed on surfaces S4 and S6 of one is formed at a higher position in the Z direction than the second vents 392A1 and 392B1 disposed on surfaces S3 and S5 of another. The surface S4 on which the first vent 392A2 is formed faces the surface S5 on which the second vent 392B1 is formed.

By arranging the lower case 130 comprising the above configuration in the X direction, the first vent 392A2 can be configured so as not to face the second vent 392B1.

With the battery pack according to the first modification, since the high-temperature gas generated at the time of use stays in the upper side, by providing the first vents 392A2 and 392B2 at a high position, ventilation efficiency is improved. In addition, since the second vents 392A1 and 392B1 are provided, the ventilation efficiency of high-temperature gas is further improved.

Second Modification

Figure 13:
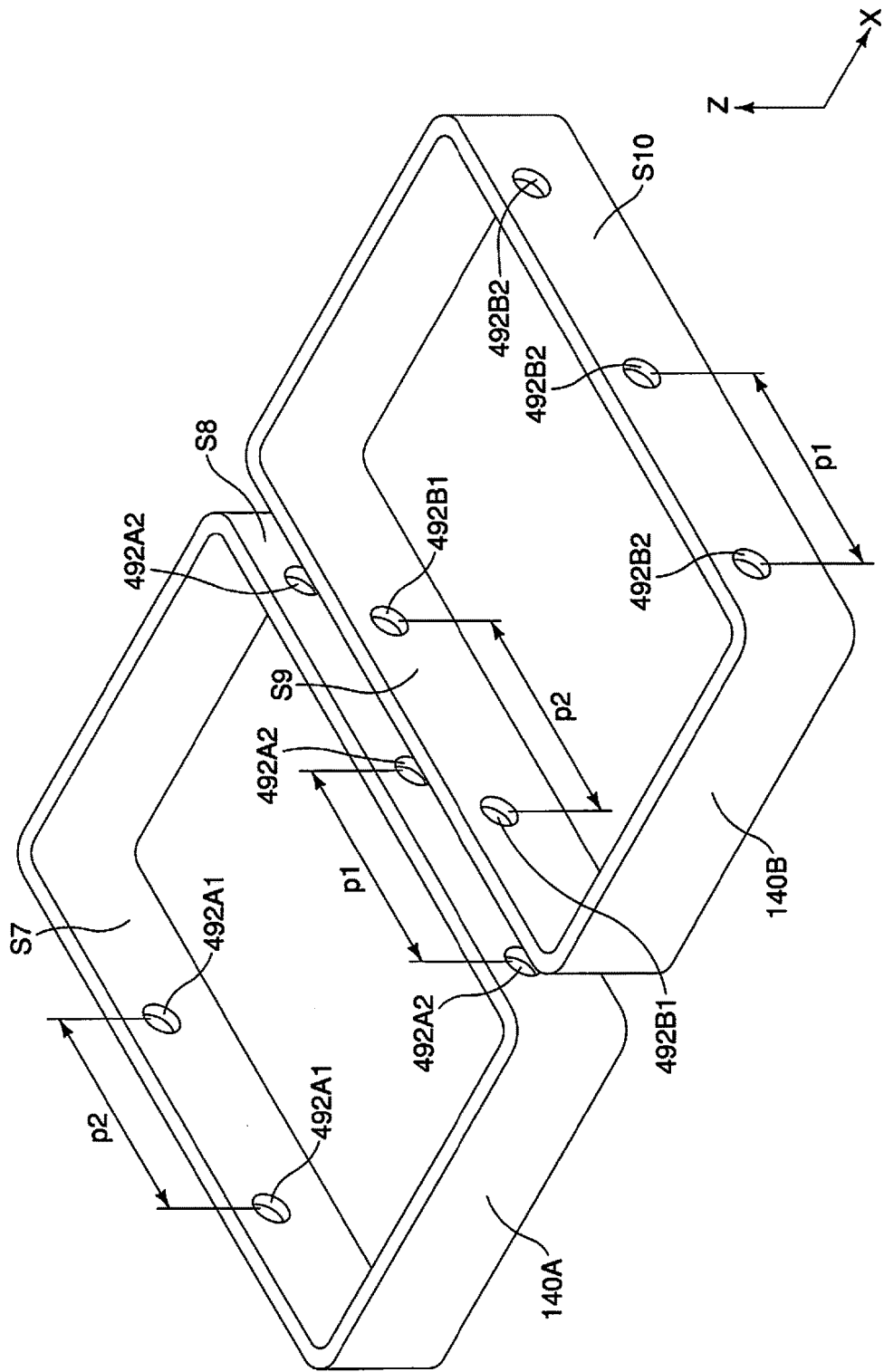
FIG. 13 is a schematic perspective view showing a battery pack according to a second modification.

FIG. 13 is a schematic perspective view showing a lower case 140 according to a second modification. In the third embodiment described above, the vent 292 is disposed only on one surface of the lower case 120, and the surface S1 comprising the vent 292A disposed on one battery module 6A faces a surface different from the surface S2 comprising the vent 292B disposed on another battery module 6B. However, as illustrated in FIG. 13, vents 492 (492A1, 492A2, 492B1, and 492B2) may be formed, as well. The forming position of the vent 492 according to the second modification will be described below.

The vent 492 may be disposed on two surfaces of one lower case 140 (140A, 140B). Namely, a vent 492A is disposed on two surfaces S7 and S8 of a lower case 140A. Additionally, a vent 492B is provided on two surfaces S9 and S10 of a lower case 140B.

Surface S7 and surface S8 are disposed on opposing surfaces among the side surfaces of the lower case 140A. In addition, surface S9 and surface S10 are disposed on opposing surfaces among the side surfaces of the lower case 140B. Meanwhile, the surfaces S7 and S8, as well as the surfaces S9 and S10, may be disposed on adjacent surfaces.

Additionally, in the lower case 140, three each of the first vents 492A2 and 492B2 are disposed on one of the surfaces S8 and S10, and two each of the second vents 492A1 and 492B1 are disposed on another of the surfaces S7 and S9. In addition, an interval P1 with which the first vents 492A2 and 492B2 are provided, and an interval P2 with which the second vents 492A1 and 492B1 are provided are equal to each other. The surface S8 on which the first vent 492A2 is formed faces the surface S9 on which the second vent 492B1 is formed.

By arranging the lower case 140 comprising the above configuration in the X direction, the first vent 492A2 can be configured so as not to face the second vent 492B1.

With the battery pack according to the second modification, the vents 492 can be reliably configured so as not to face each other.

Third Modification

The present invention is not limited to configurations according to the first embodiment-third embodiment, the first modification, and the second modification, and encompasses other configurations as long as the vents of adjacent battery modules thereof do not face each other. For example, the battery modules according to the first embodiment-third embodiment, the first modification, and the second modification may by suitably combined.

The invention claimed is:

1. A battery pack, comprising:
   a first battery module and a second battery module arranged adjacent the first battery module so as to define an open space portion,
   each of the first and second battery modules comprising a case configured to house at least one single cell,
   each case comprising
   a wall portion including a vent through which an inside of the case is capable of communicating with an area outside the case, and a wall region without the vent,
   the vent disposed in the wall portion of the case of the first battery module opens directly toward and vents directly into the open space portion and toward the wall region of the case of the second battery module, when the first battery module is disposed adjacent to the second battery module such that the vent disposed in the wall portion of the case of the first battery module is not directly opposite the vent disposed in the wall portion of the case of the second battery module, the open space portion being defined by opposing wall portions of the cases of the adjacent first and second battery modules.

2. The battery pack according to claim 1, wherein the vent is disposed at a high position in a direction that intersects with a surface direction of a surface of the at least one single cell.

3. The battery pack according to claim 1, wherein each case comprises
   a first case portion, and
   a second case portion,
   the first case portion and the second case portion comprising
   mating portions opposed to each other via a gap, and
   the vent is formed from the mating portions.

4. The battery pack according to claim 1, wherein each case of the first and second battery modules includes a first surface and a second surface, the vent is a first vent of a plurality of vents, the first vent is disposed on the first surface of the case, and a second vent of the plurality of vents is disposed on the second surface, and the first vent disposed on the first surface of the case of the first battery module and the second vent disposed on the second surface of the case of the second battery module have different height positions in a direction that intersects with a surface direction of a surface of the at least one single cell.

5. The battery pack according to claim 1, wherein each case of the first and second battery modules includes a first surface and a second surface, the vent is a first vent of a plurality of vents, a first predetermined number of the plurality of vents is disposed on the first surface of the case, and a second predetermined number of the plurality of vents is disposed on the second surface, the first predetermined number of the plurality of vents is different from the second number of the plurality of vents, and an interval with which the first predetermined number of the plurality of vents are disposed and an interval with which the second predetermined number of the plurality of vents are disposed are the same.

6. The battery pack according to claim 1, wherein the cases of each of the first and second battery modules have a substantially similar shape.

7. The battery pack according to claim 2, wherein each case comprises a first case portion, and a second case portion, the first case portion and the second case portion comprising mating portions opposed to each other via a gap, and the vent is formed from the mating portions.

8. The battery pack according to claim 2, wherein each vent of the first and second battery modules is the only vent disposed in the case, and is disposed on a first surface of the case, and the vent disposed on the first surface of the case of the first battery module faces a second surface of the case of the second battery module different from the first surface of the case of the second battery module, when the first battery module is adjacent to the second battery module.

9. The battery pack according to claim 3, wherein each vent of the first and second battery modules is the only vent disposed in the case, and is disposed on a first surface of the case, and the vent disposed on the first surface of the case of the first battery module faces a second surface of the case of the second battery module different from the first surface of the case of the second battery module, when the first battery module is adjacent to the second battery module.

10. The battery pack according to claim 2, wherein each case of the first and second battery modules includes a first surface and a second surface, the vent is a first vent of a plurality of vents, the first vent is disposed on the first surface of the case, and a second vent of the plurality of vents is disposed on the second surface, and the first vent disposed on the first surface of the case of the first battery module and the second vent disposed on the second surface of the case of the second battery module have different height positions in a direction that intersects with a surface direction of the surface of the at least one single cell.

11. The battery pack according to claim 3, wherein each case of the first and second battery modules includes a first surface and a second surface, the vent is a first vent of a plurality of vents, the first vent is disposed on the first surface of the case, and a second vent of the plurality of vents is disposed on the second surface, and the first vent disposed on the first surface of the case of the first battery module and the second vent disposed on the second surface of the case of the second battery module have different height positions in a direction that intersects with a surface direction of a surface of the at least one single cell.

12. The battery pack according to claim 2, wherein each case of the first and second battery modules includes a first surface and a second surface, the vent is a first vent of a plurality of vents, a first predetermined number of the plurality of vents is disposed on the first surface of the case, and a second predetermined number of the plurality of vents is disposed on the second surface, the first predetermined number of the plurality of vents is different from the second number of the plurality of vents, and an interval with which the first predetermined number of the plurality of vents are disposed and an interval with which the second predetermined number of the plurality of vents are disposed are the same.

13. The battery pack according to claim 3, wherein each case of the first and second battery modules includes a first surface and a second surface, the vent is a first vent of a plurality of vents, a first predetermined number of the plurality of vents is disposed on the first surface of the case, and a second predetermined number of the plurality of vents is disposed on the second surface, the first predetermined number of the plurality of vents is different from the second number of the plurality of vents, and an interval with which the first predetermined number of the plurality of vents are disposed and an interval with which the second predetermined number of the plurality of vents are disposed are the same.

14. The battery pack according to claim 2, wherein the cases of each of the first and second battery modules have a substantially similar shape.

15. The battery pack according to claim 3, wherein the cases of each of the first and second battery modules have a substantially similar shape.

16. The battery pack according to claim 4, wherein the cases of each of the first and second battery modules have a substantially similar shape.

17. The battery pack according to claim 5, wherein the cases of each of the first and second battery modules have a substantially similar shape.

* * * * *